(12) United States Patent
Bank

(10) Patent No.: US 10,250,061 B1
(45) Date of Patent: Apr. 2, 2019

(54) SYSTEM FOR CHARGING ELECTRICALLY DRIVE VEHICLES WITH A SINGLE LINE FOR TRANSMITTING ELECTRIC CURRENT FROM A SOURCE TO A CHARGING STATION

(71) Applicant: Michael Bank, Jerusalem (IL)

(72) Inventor: Michael Bank, Jerusalem (IL)

( * ) Notice: Subject to any disclaimer, the term of this patent is extended or adjusted under 35 U.S.C. 154(b) by 0 days.

(21) Appl. No.: 15/894,347

(22) Filed: May 8, 2018

(51) Int. Cl.
*H01M 10/46* (2006.01)
*H02J 7/00* (2006.01)
*B60L 11/18* (2006.01)

(52) U.S. Cl.
CPC ............ *H02J 7/0081* (2013.01); *B60L 11/185* (2013.01); *H02J 7/0027* (2013.01); *H02J 7/0065* (2013.01)

(58) Field of Classification Search
CPC .............. H02J 7/022; H02J 7/1469; H02J 7/16
USPC .......................... 320/107, 108, 109, 140, 142
See application file for complete search history.

(56) References Cited

U.S. PATENT DOCUMENTS

2013/0257372 A1* 10/2013 Chen .................... B60L 11/1816
320/109
2016/0121741 A1* 5/2016 Kim .................... B60L 11/1814
318/139
2016/0375781 A1* 12/2016 Herke ................. B60L 11/1838
320/109

* cited by examiner

*Primary Examiner* — Edward Tso
(74) *Attorney, Agent, or Firm* — Henry M. Feiereisen LLC

(57) ABSTRACT

A system for charging electrically driven vehicles includes a source of three phase electrical current, a first converter converting the three-phase or one-phase electric current received from the source into a converted electric current, a single electric current transmission line transmitting the converted electric current, a second converter converting the converted signal received through the single line into three phase electric current, or one phase electric current, or direct current, and a plurality of charging stations receiving from the second converter corresponding currents and provided with charging components for charging electrically driven vehicles with a corresponding one of the received currents.

7 Claims, 5 Drawing Sheets

SYSTEM FOR CHARGING ELECTRICALLY DRIVE VEHICLES WITH A SINGLE LINE FOR TRANSMITTING ELECTRIC CURRENT FROM A SOURCE TO A CHARGING STATION

BACKGROUND OF THE INVENTION

The present invention relates to systems for charging electrically driven vehicles.

System for charging electrically driven vehicles are generally known in the modern automotive industry. A known system for charging electrically driven vehicles usually includes a source of electric current, multiple wires lines extending above the ground from the source of electric current, and multiple charging stations connected with the source of electric current by the multiple wire lines for receiving the electric current and provided with charging means for charging electrically driven vehicles with the thusly received current.

Nowadays however there is a problem associated with the need for fast charging of electrically driven vehicles. The time of charging depends on voltage in a charging device. The higher is the voltage, the shorter is the charging time. In residential areas the voltage is 380 volts, and with this voltage the time of charging is approximately 8 hours. This is generally acceptable in living areas or in employment areas. However, there are situations when it is necessary to provide a fast charging, for example on highways or other places where a vehicle battery discharged. It is very expensive to erect high poles with high voltages wires along highways, and in many case is just impossible.

It is believed that the existing systems for charging electrically driven vehicles can be improved in these aspects.

SUMMARY OF THE INVENTION

Accordingly, it is an object of the present invention to provide a system for fast charging electrically driven vehicles, which is a further improvement of existing systems for charging electrically driven vehicles, including those installed on the highway.

In keeping with these objects and with others which will become apparent hereinafter one feature of the present invention resides briefly stated in a system for charging electrically driven vehicles, which has a source of electrical current, first converting means for converting the electric current received from the source into a converted electric current, a single electric current transmission line transmitting the converted electric current, second converting means for converting the converted signal received through the single electric current transmission line into an electric current selected from the group consisting of three phase electric current, one phase electric current, direct current, and combinations thereof, a plurality of charging stations connected with the second converting means for receiving from the second converting means one of three phase electric current, one phase electric current, direct current, or combinations thereof and provided with charging means for charging electrically driven vehicle with a corresponding one of the received currents.

When a system for charging electrically driven vehicles is designed in accordance with the present invention, it is significantly advantageous over the existing systems since instead of multiple electrical current transmission lines which are run above the ground it utilizes a single electrical current transmission line which can be located underground.

Also, each charging station can have several different charging currents suitable for charging electric vehicles operating with different types of currents.

It is actually impossible to transmit a three-phase signal underground. It would be necessary to build underground tunnels, since a great distance must be provided between the wires.

According to a further feature of the present invention the first converting means include a converter for converting a three-phase electric current into an electric signal which can be transmitted through a single electric current transmission line.

According to a further feature of the present invention the second converting means include a converter for converting the signal received from the single electric current transmission line into a three-phase electric current.

According to a further feature of the present invention the second converting means include a converter for converting the signal received from the single electric current transmission line into a one-phase electric current;

According to a further feature of the present invention the second converting means include a converter for converting the signal received from the single electric current transmission line into a direct current.

The novel features of the present invention are set in particular in the appended claims.

The invention itself however both as to its construction and manner of operation will be best understood from the following description of the preferred embodiments, which is accompanied by the following drawings.

DESCRIPTION OF THE PREFERRED EMBODIMENTS

Figure 1:
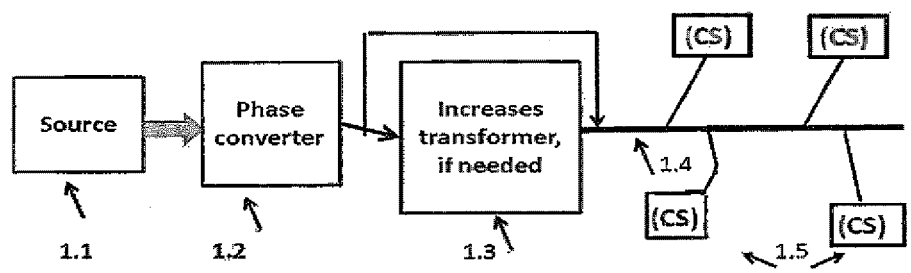
FIG. 1 is a view showing a system for charging electrically driven vehicles according to the present invention.
Figure 2:
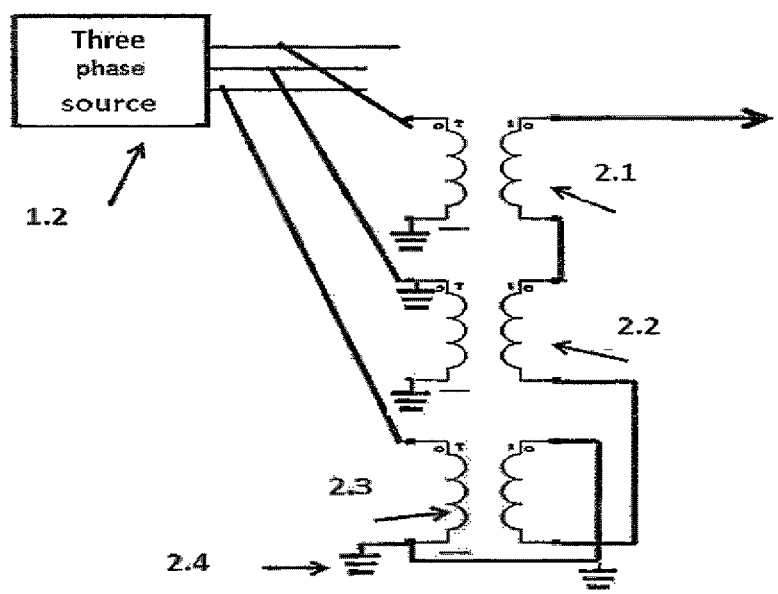
FIG. 2 is a view showing a converter for converting a three-phase electric current into an electric signal which can be transmitted through a single electric current transmission line.

The converter shown in FIG. 2 which converts a three-phase electric current into an electric current which can be transmitted through the single electric current transmission line 1.4 includes a system of three transformers 2.1, 2.2 and 2.3. Electric currents of each phase of the source of three-phase electric current 1.1 are supplied to each of the primary windings of the transformers 2.1, 2.2, 2.3. In the transformer 2.3. the windings are connected opposite to one another for inversion of the current. The secondary windings of all transformers are connected in series. The upper end of the secondary winding of the transformer 2.1 is an output of the converter. The lower end of the primary windings of the transformers 2.1, 2.2 and 2.3 and the lower end of the secondary winding of the transformer 2.3 are connected with a nullifier 2.4. The converter is disclosed in our U.S. patent application Ser. No. 15/732,500 filed Nov. 20, 2017. The nullifier 2.4 reduces an electrical potential of the system and can be formed as a conventional grounding, or can be formed as a grounding with a limited ground volume, as disclosed in our U.S. patent application Ser. No. 15/144,330 filed May 2, 2016 and in the book MBank "It is Quite Another Electricity", Second Edition, Revised, Partridge Publishing 2017, Amazon.com.

Figure 3:
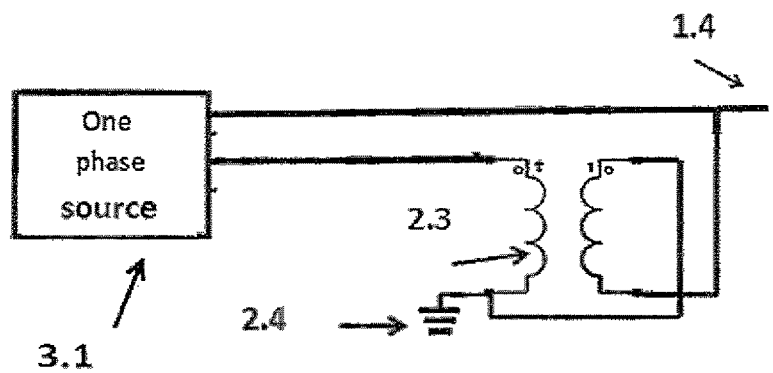
FIG. 3 is a view showing a converter for converting a one phase electric current into an electric signal which can be transmitted through a single current transmission line.

The converter shown in FIG. 3 converts a current which can be transmitted from the source 3.1 through the single electric current transmission line 1.4. It combines two currents after passing one of the currents through the inverter 2.3.

Figure 4:
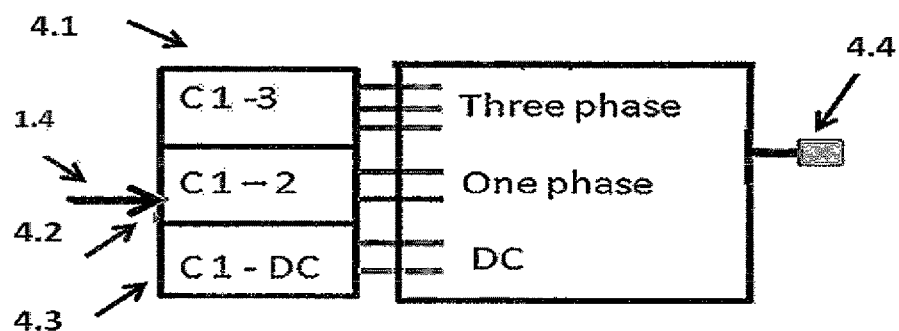
FIG. 4 is a view showing a charging station of the inventive system for charging electrically driven vehicles.

The charging station 1.5 shown in FIG. 4 receives the electric current from the single line 1.4. The charging station can have three, two or only one output converter. A converter C1-3 4.1 converts the signal received through the single line into a three-phase current. A converter C1-2 4.2 converts the signal received through the single line into a one phase current. A converter C1-DC 4.3 converts the signal received through the single line into a direct current. All these converters have output units connectable with a charging device 4.4 of an electrically driven vehicle.

Figure 5:
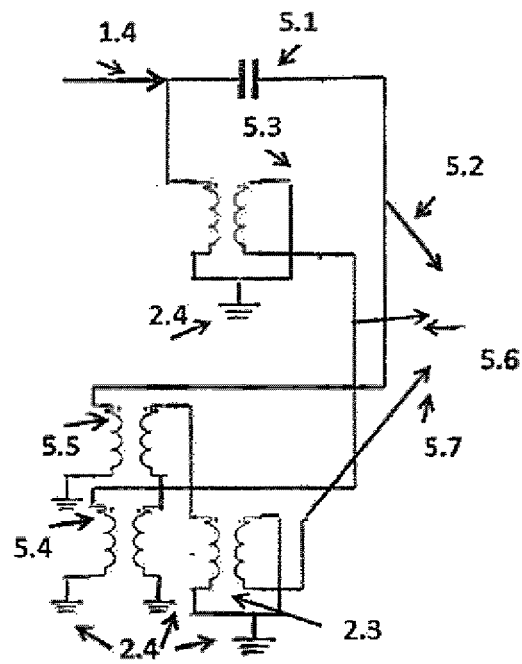
FIG. 5 is a view showing a converter for converting the signal received from the single electric current transmission line into a three-phase electric current.

The output converter for providing a three-phase output current is shown in FIG. 5. It provides separation of the current received through the single line 1.4 into three currents and conversion of their phases into phases which are conventionally used in a three-phase system. The first current passes through a phase shifter composed of a capacitor 5.1 or inductor and resister, where resistance is a load of one of the phases 5.2. This phase shifter shifts the phase by 60 degrees. This means that the ratio of the inductive or capacitive resistance to an active one must be tangent of 60 degrees, or 1.73. The current from the output of the phase shifter is supplied to 5.2 which is a load of the first phase line. The current from the single line 1.4 also goes through the inverter 5.3 and adds in a secondary winding of the transformer 5.4 with the separated current from the single line through the transformer 5.5. The sum of the currents goes into 5.6 which is a load of a second phase line. The current of the third phase line 5.7 is obtained after inverting of the separated current of the single line in the inverter 2.3.

Figure 6:
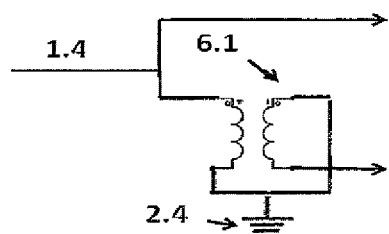
FIG. 6 is a view showing a converter for converting the signal received from the single electric current transmission line into a one-phase electric current.

FIG. 6 shows an output converter for supplying a one-phase output current. The current supplied through the single line 1.4 is separated into two currents and one of them is inverted. The inverter 6.1 includes a transformer with oppositely connected windings and a nullifier 2.4 connected with both windings.

Figure 7:
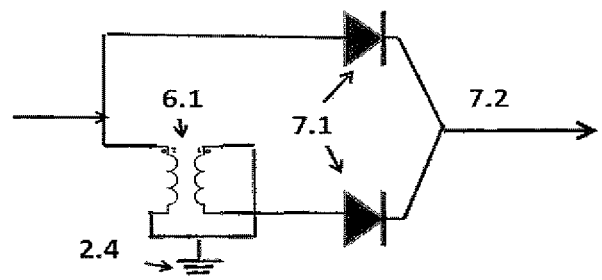
FIG. 7 is a view showing a converter for converting the signal received from the single electric current transmission line into a direct current.

FIG. 7 shows an output converter for supplying a direct current. It provides separation of one of the currents into two currents and conversion of one of them by the inverter 2.3. Both current without inverting and after the inverter 2.3 pass through diodes 7.1 connected with the same polarity. Output points of both diodes are connected and represent an output of a signal DC 7.2.

Figure 8:
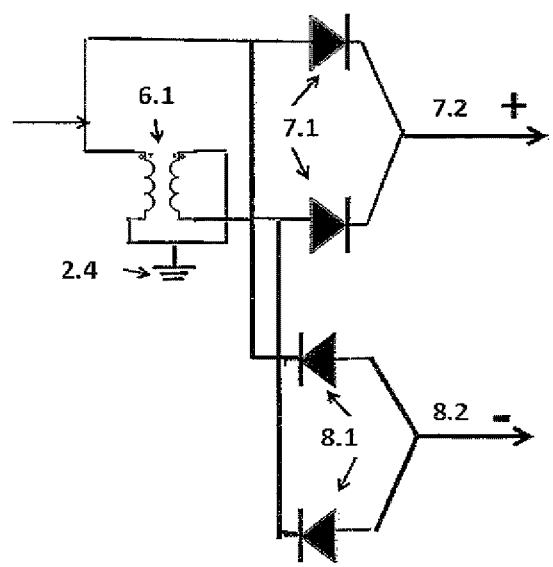
FIG. 8 is a view showing a two-pole converter for converting the signal received from the single electric current transmission line into a direct current.

FIG. 8 shows a two-pole output inverter for supplying a direct current. It separates the current received from the single line into two currents and inverting one of them by the inverter 2.3. Both currents without inverting and after the inverter 2.3 pass twice through diodes 7.1 with one polarity and diodes 8.1 connected with another polarity. Output points of both diode pairs are connected and form two polar output of the signal DC 7.2 and 8.2.

The present invention is not limited to the details shown since various modifications and structural changes are possible without departing from the spirit of the invention.

What is desired to be protected by Letters Patent is set forth in particular in the appended claims.

What is claimed is:

1. A system for charging electrically driven vehicles, comprising
   a source of electrical current selected from the group consisting of three-phase current and one-phase current;
   first converting means for converting the electric current received from the source into a converted electric current;
   a single electric current transmission line transmitting the converted electric current;
   second converting means for converting the converted electric current received through the single electric current transmission line into an electric current selected from the group consisting of three-phase electric current, one phase electric current and direct current;
   a plurality of charging stations connected with the second converting means for receiving from the latter at least one of the three-phase electric current, one phase electric current, and direct current, and provided with charging means for charging electrically driven vehicles with the at least one of the currents received from the second converting means.

2. The system of claim 1, wherein the single electrical current transmission line extends in ground.

3. The system of claim 1, wherein the first converting means includes a system of three transformers, with electric currents of each phase of the source of three-phase electric current supplied to each of primary windings of the transformers, with a secondary winding of one of the transformers connected opposite to its primary winding for inversion of the current, secondary windings of the transformers are connected in series, an upper end of the secondary winding of one of the transformers is an output of the converter, a lower end of the primary windings of one of the transformers and a lower end of the secondary winding the other of the transformers are connected with a nullifier.

4. The system of claim 1, wherein the second converting means include an output converter for providing a three-phase output current by separation of the current received through the single line into three currents and conversion of their phases into phases which are conventionally used in a three-phase system, such that a first current passes through a phase shifter composed of a capacitor or inductor and a resister where resistance is a load of one of the phases, the phase shifter shifts the phase by 60 degrees, the current from the output of the phase shifter is supplied which is a load of the first phase line, the current from the single line also goes through an inverter and adds in a secondary winding of the transformer with the separated current from the single line through the transformer, the sum of the currents goes into a load of a second phase line, and the current of the third phase line is obtained after inverting of the separated current of the single line in the inverter.

5. The system of claim 1, wherein the second converting means include an output converter for supplying a one-phase output current, such that the current supplied through the single electric current transmission line is separated into two currents and one of them is inverted by an inverter which includes a transformer with oppositely connected windings and a nullifier connected with both windings.

6. The system of claim 1, wherein the second converting means include an output converter for supplying a direct current by providing separation of one of the currents into two currents and conversion of one of them by a converter, with both other current without inverting and after the inverter passing through diodes connected with the same polarity and having output points of both diodes are connected and representing an output of the converter.

7. The system of claim 1, wherein the second converting means include a two-pole output inverter for supplying a direct current, with It separating the current received from the single electric current transmission line into two currents and inverting one of them by the inverter, with both other currents without inverting and after the inverter passing twice through diodes with one polarity and diodes connected with another polarity, with output pints of both diode pairs connected and form two-polar output of the converter.

* * * * *